(12) United States Patent
Hunter et al.

(10) Patent No.: US 6,764,754 B1
(45) Date of Patent: Jul. 20, 2004

(54) COMPOSITE MATERIAL WITH IMPROVED DAMPING CHARACTERISTICS AND METHOD OF MAKING SAME

(75) Inventors: Kipplan Hunter, St. Peters, MO (US); Salvatore L. Liguore, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/620,066

(22) Filed: Jul. 15, 2003

(51) Int. Cl.[7] ............................................. B32B 27/12
(52) U.S. Cl. ........................ 428/301.4; 428/299.1; 428/361; 428/364; 427/386; 427/410
(58) Field of Search ................. 428/299.1, 301.4, 428/361, 364; 427/386, 410

(56) References Cited

U.S. PATENT DOCUMENTS

| | | |
|---|---|---|
| 4,182,495 A | 1/1980 | Borgmeier et al. |
| 4,401,495 A | 8/1983 | McKinney |
| 4,463,044 A | 7/1984 | McKinney |
| 4,556,439 A | 12/1985 | Bannink, Jr. |
| 4,608,220 A | 8/1986 | Caldwell et al. |
| 4,767,656 A | 8/1988 | Chee et al. |
| 4,851,501 A | 7/1989 | Lubowitz et al. |
| 5,268,055 A * | 12/1993 | Bales et al. ................ 156/252 |
| 5,902,755 A | 5/1999 | Driggett et al. |
| 6,399,199 B1 | 6/2002 | Fujino et al. |
| 6,419,774 B1 * | 7/2002 | Clifford ..................... 156/71 |
| 6,696,164 B2 * | 2/2004 | Clifford ..................... 428/464 |

* cited by examiner

*Primary Examiner*—Merrick Dixon
(74) *Attorney, Agent, or Firm*—Alston & Bird LLP (57) ABSTRACT

A composite laminate structure formed from at least one high-strength, high-stiffness fiber-resin composite structural lamina laminated to at least one fiber-resin composite damping lamina, wherein the resin matrix of the structural lamina resides below its glassification temperature ($T_g$) and wherein the resin matrix of the damping lamina resides above its glassification temperature during normal use temperatures, thereby providing a high-strength laminate with improved damping properties.

27 Claims, 7 Drawing Sheets

COMPOSITE MATERIAL WITH IMPROVED DAMPING CHARACTERISTICS AND METHOD OF MAKING SAME

FIELD OF THE INVENTION

The invention relates to composite resin matrix structures and a method of making composite resin matrix structures, such as those used in aerospace applications. More particularly, the invention relates to a composite resin matrix structure having stiffness appropriate for aerospace and other applications but having improved damping characteristics that resist damage caused by acoustics and vibration.

BACKGROUND OF THE INVENTION

The use of composite structures in the aerospace industry has become more and more prevalent due to the desirable properties of composites, especially low weight, high strength and stiffness, and resistance to corrosion, among other properties. Composite materials are now being used for aircraft wings, horizontal and vertical stabilizers, nose and tail cones, and elements of the aircraft's primary structure. Composites are also being used for secondary elements of aircraft, such as internal floor panels, wall panels, and similar structural elements. The advantageous properties of composites have increased aircraft performance benefits, including increased range, decreased fuel consumption, and greater payload. Added performance benefits guide the use of composites throughout the aerospace industry.

As advancements in composite design have progressed, the composites have improved in strength and stiffness. Stiffness of the composite is important since stiffness is generally related to the strength of the material and provides better performance under aerodynamic loads. However, as composites have been successfully stiffened, problems with acoustics and vibrations have remained an issue. In fact, increased stiffness of the composites often increases the susceptibility of the composite to fatigue from vibration.

Stiffened composites often do not adequately attenuate acoustics and vibrations associated with buffet, flow-induced noise, shock/boundary layer interaction, turbulence, and mechanical noise. Acoustic forces act to fatigue composite structures over time and may lead to cracks during the service life of the composites structures.

Because premature cracking of composite materials on aerospace vehicles leads to costly repairs and maintenance schedules, there has been much research into the enhancement of damping in composite structures, particularly over the past 15 years. One technique, known as interleaving, involves co-curing viscoelastic layers into a composite laminate. Interleaving has been one of the more common approaches to increase damping, but it does require some special processing when applied to larger built-up structures.

On a macro-mechanical level, the damping can be maximized through inter-laminar stresses by variation of fiber orientation (more cross plies), increased stress (anisotropic) bending-twisting coupling, or wavy-fiber placement.

On the micro-mechanical level, damping has been increased through variation of fiber-volume-fraction, and fiber-aspect-ratio, coated fibers and woven fabric polymer matrix composites.

Despite the advances in micro-mechanical and macro-mechanical damping of composite materials, acoustic fatigue is still problematic. It is, therefore, desired to provide a composite material with integral damping characteristics capable of protecting the composite from fatigue while retaining stiffening characteristics that make the composite desirable for use in aerospace applications. It is further desired to provide a composite material that is economically fabricated and, most preferably, customizable for specific applications.

SUMMARY OF THE INVENTION

One advantageous embodiment of the invention is a composite laminate structure formed from at least one high-strength, high-stiffness fiber-resin composite structural lamina laminated to at least one fiber-resin composite damping lamina, wherein the resin matrix of the structural lamina resides below its glassification temperature ($T_g$) and wherein the resin matrix of the damping lamina resides above its glassification temperature during normal use temperatures, thereby providing high-strength lamina in combination with pliable, high-damping lamina that attenuates acoustics and vibrations throughout the composite structure.

The damping laminae are combined with structural laminae to form a composite laminate structure using techniques known in the art of composite laminate formation. The resulting laminate has overall strength and rigidity characteristics that are the same or insubstantially inferior to otherwise similar structural composite laminates of the art. However, the invented laminate exhibits damping characteristics that are dramatically improved compared to prior structural composite laminates. For instance, with the practice of this invention, composite laminates have been formed that provide a ten fold increase in damping over laminates that were not produced in accordance with this invention. The improved damping occurs with almost no loss of strength in the overall laminate.

The invention may alternatively be viewed as a composite fiber-resin laminate in which the resin matrix $T_g$ of some lamina is substantially higher than the resin matrix $T_g$ of other lamina within the same laminate.

The invention may further alternatively be viewed as a composite fiber-resin laminate in which the resin matrix of at least one lamina exhibits viscoelastic behavior while the resin matrix of the other laminae exhibits glassy behavior.

The invention is based upon the discovery that damping laminae comprising a resin matrix having a $T_g$ below the use temperature of the laminate have dramatically enhanced acoustic attenuation characteristics compared to similar laminae having resin matrices with $T_g$'s above their use temperature. When the damping laminae are combined with a structural laminae (a laminae having a $T_g$ well above its use temperature), the resulting laminate has stiffened structural properties that provide strength to the laminate as well as damping properties that attenuate acoustics and vibrations throughout the laminated structure.

Each of the lamina of the laminate comprise multiple plies of a high-strength fiber embedded within a resin matrix material. The fibers may be chopped, semi-continuous, or continuous and are typically carbon fibers but may also be other high-strength fibers, such as aramid fibers. If continuous, the fibers may have a unidirected orientation or may comprise a dual or triaxial fabric weave. The thermosetting matrix resins of the laminate may be epoxy resins, blends of epoxy resins, or other thermosetting resins that preferably have a curing temperature lower than about 400° F., and that are thermally stable to at least about 200° F.

According to one embodiment of the invention, the $T_g$ of the damping lamina resin matrix is lowered by addition of a plastisizing agent to the resin prior to cure of the resin.

Plastisizing agents are added to the thermosetting polymer, such as an epoxy, in an amount between about 12 wt % and about 35 wt %, and preferably about 12.5 wt % to about 17 wt %, by total weight of the resin composition. The plastisizer acts to lower the $T_g$ of the resin. For instance, the intrinsic $T_g$ of most epoxies is above 250° F., but addition of plastisizer to the epoxy in an amount between about 12 wt % and 35 wt % depresses the $T_g$ of the epoxy below room temperature.

According to another embodiment of the invention, a commercially available epoxy resin having a depressed $T_g$ temperature is acquired and used as the matrix resin for the damping lamina. Using the commercial epoxy, a damping lamina may be prepared as known in the art. An exemplary commercial epoxy for use with the damping lamina is Duralco™4538N epoxy resin, available from Cotronics Corp, Brooklyn, N.Y.

Optimal damping has been found to occur at a temperature that is between about 50° F. and 100° F. above the $T_g$ of the resin. So, plasticizers are preferably used to depress the $T_g$ of the damping laminae resins to between 50° F and 100° F. below the predicted end use temperature of the laminate. Alternatively, commercial epoxies having $T_g$ of between 50° F. and 100° F. below the predicted end use temperature of the laminate are used. Because the $T_g$ may be manipulated by the amount of plasticizer used in the damping resin, laminates may be customized for optimum performance at their particular end use temperature.

Other than manipulation of the resin $T_g$, the laminate may be layed-up, impregnated, cured, and formed according to methods used to fabricate traditional fiber-resin laminates. Therefore, no special fabrication equipment is required to practice the invention.

The laminates of the invention are particularly suited for aerospace applications due to their combined qualities of stiffness and vibration damping. The laminates may also be useful in other applications, such as the formation of boat hulls, automotive panels, external and internal architectural components, and any other uses requiring high-strength, high-damping composite structures.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The laminate structure constructed in accordance with the invention is designed to be load-bearing and to have acoustic damping characteristics. Each such structure comprises a plurality of laminae, at least one lamina of a high-strength, stiffened composite, hereinafter referred to as the "structural laminae", and at least one lamina of fiber-resin composite material designed for increased damping, hereinafter referred to as the "damping laminae". The overall structure may have an entirely laminate construction (sheet-like layers), a honeycomb construction, or a construction that is a combination of laminate and honeycomb. The laminate and/or honeycomb structure in each case may be flat or shaped or contoured to meet the requirements of a particular installation.

Each of the laminae comprises multiple plies of a high-strength fiber embedded within a resin matrix material. The specific type of fibrous material and its orientation and/or weave will of course be chosen to meet the load requirements of a particular situation. The fiber may be provided in a variety of orientations and the orientation of the fiber may be the same or different for each ply within a composite lamina, or within each lamina within the laminate structure. For example, the fibers may have a unidirected orientation or may comprise a dual or triaxial fabric weave.

In general, carbon/graphite fibers utilized, such as the graphite fiber sold by Celanese Corporation under the trademark Celion™, or aramid fibers, such as the aramid fiber sold by DuPont under the trademark Kevlar™. Graphite fibers have the advantage that their coefficent of thermal expansion along their length is close to zero. Glass fibers may also be used in accordance with the invention. S-glass and E-glass fibers may advantageously be used as the fibers in the fiber-resin composites. In the case of a honeycomb or partially honeycomb construction, the reinforcing fibers in the honeycomb portion of the structure may be glass fibers.

For production of high strength composite laminates, it is preferred that continuous fibers, particular continuous carbon fibers, be used within each lamina. The invention may, however, be practiced with semi-continuous or chopped fibers. If non-continuous fibers are used within the laminate, it is preferred that the non-continuous fibers be used within the damping lamina and that continuous fibers be used within the structural lamina.

The resin matrix materials may be thermosetting resins, and more particularly, may be epoxy resins or blends of epoxy resins such as, for example, Epon™ 828 resin supplied by Shell Chemical Company, Houston, Tex. Other epoxies are available commercially as Narmco™ 5208, Hercules™ 3501, and Fiberite™ 934 epoxy compositions.

Most epoxies used in composite fabrication are produced by the condensation reaction of epichlorohydrin and Bisphenol-A, but other epoxies may be used, such as the aliphatic and cycloaliphatic epoxy resins, the glycidated novolacs, and the tetraglycidyl ether of tetraphenylolethane. Any epoxy resin can be used as a thermosetting matrix resin, as long as the composite formed with the resin is thermally stable to at least 200° F., and preferably to at least about 350° F.

The epoxy resins are normally blended with an epoxy resin curing agent, at a weight ratio of from about 5:1 to about 5:6 total resin:curing agent, of which there are many known. The curing agent is used to enhance polymer growth, build molecular weight, and encourage three dimensional structures by the crosslinking of the epoxide resins used as starting materials.

The resins used in the structural laminae are distinct from those used in the damping laminae. The resins, most typically thermosetting resins, used in the structural laminae have a glassification temperature ($T_g$) well above the anticipated use temperature of the article formed from the composite. Because the resin of the structural laminae exist in a glassified state, each lamina has relatively high stiffness and rigidity. The structural laminae resins are those, particularly epoxies, that are commonly known to result in composite structures of high stiffness.

The thermosetting resins used in the damping laminae have a glassification temperature ($T_g$) below the anticipated use temperature of the article formed from the composite, and therefore reside in a viscoelastic state.

According to one embodiment of the invention, the depressed $T_g$ temperature is achieved by addition of a plasticizing compound in an amount between about 12 wt % and about 35 wt % by total weight of the resin (including the resin, curing agent, plastisizing agent, and other additives, but not the embedded fiber), and preferably about 12.5 wt % to about 17 wt %, by total weight of the resin composition. Plasticizing agents are those polar agents with low molecular weight, i.e. MW of about 100 to 500, that tend to reduce the hardness or lower the $T_g$ of the plastic to which they are added. Plasticizers for a variety of resins, including epoxies, are known in the art. The plastisizing agent may be premixed with the resin or with the curing agent prior to impregnation of the fiber and curing of the resin. Addition of varied amounts of plastisizer vary the $T_g$ of particular epoxies over a temperature range of well below room temperature, for instance 0° F., for high weight percentages of plastisizer, to slightly above room temperature, for instance 100° F., for medium weight percentages of plastisizer.

According to an alternative embodiment of the invention, a commercial resin having depressed Tg properties is obtained and used to impregnate the fiber of the damping lamina. One such commercial resin is an epoxy sold as Duralco™ 4538N epoxy resin, available from Cotronics Corp, Brooklyn, N.Y. The Duralco™ epoxy is sold in kits which enable the mixing of the resin with different weight percentages of hardener, wherein the hardener contains a curing agent and a softening agent which acts to lower the $T_g$ of the epoxy resin. The $T_g$ of the Duralco™ epoxy is varied simply by varying the ratio of the hardener to resin before the resin is cured.

According to yet another embodiment of the invention, synthetic or natural rubber compounds are added to the thermoset resin of the damping layer in order to lower the $T_g$ of the thermoset resin. The amount of rubber needed to lower the $T_g$ to the desired level is easily determined by experimentation.

In contrast to the damping laminae, the thermoset resin of the structural lamina has a $T_g$ well above room temperature, or the use temperature of the article formed from the laminate. The structural laminae may be prepared by utilizing an epoxy or similar thermoset resin with a plasticizer content below about 10 wt % by total weight of the structural resin (including the resin, curing agent, platisizing agent, and other additives, but not including the fiber). By maintaining the $T_g$ of the resin above the use temperature of the resin, it is ensured that the structural laminae of the laminate will be stiffened and supply ample structural support to the laminate structure.

The fiber content of the laminate may differ substantially depending upon the design of the laminate and the desired purpose of the laminate. In general, the fiber-resin composites for use in aerospace application comprise from about 40 wt % to about 70 wt % fiber per total weight of the laminate, and preferably about 60 wt %.

It has been found that damping laminae comprising a resin matrix having a $T_g$ below the use temperature have dramatically enhanced acoustic attenuation characteristics compared to similar composites in which the $T_g$'s of all the laminae are above their use temperature, as has heretofore been the practice in composite laminate fabrication. When damping laminae are laminated with structural laminae, the resulting laminate has stiffened structural characteristics that provide strength to the laminate and, at the same time, damping characteristics that attenuate acoustics and vibrations throughout the laminated structure.

Figure 1:
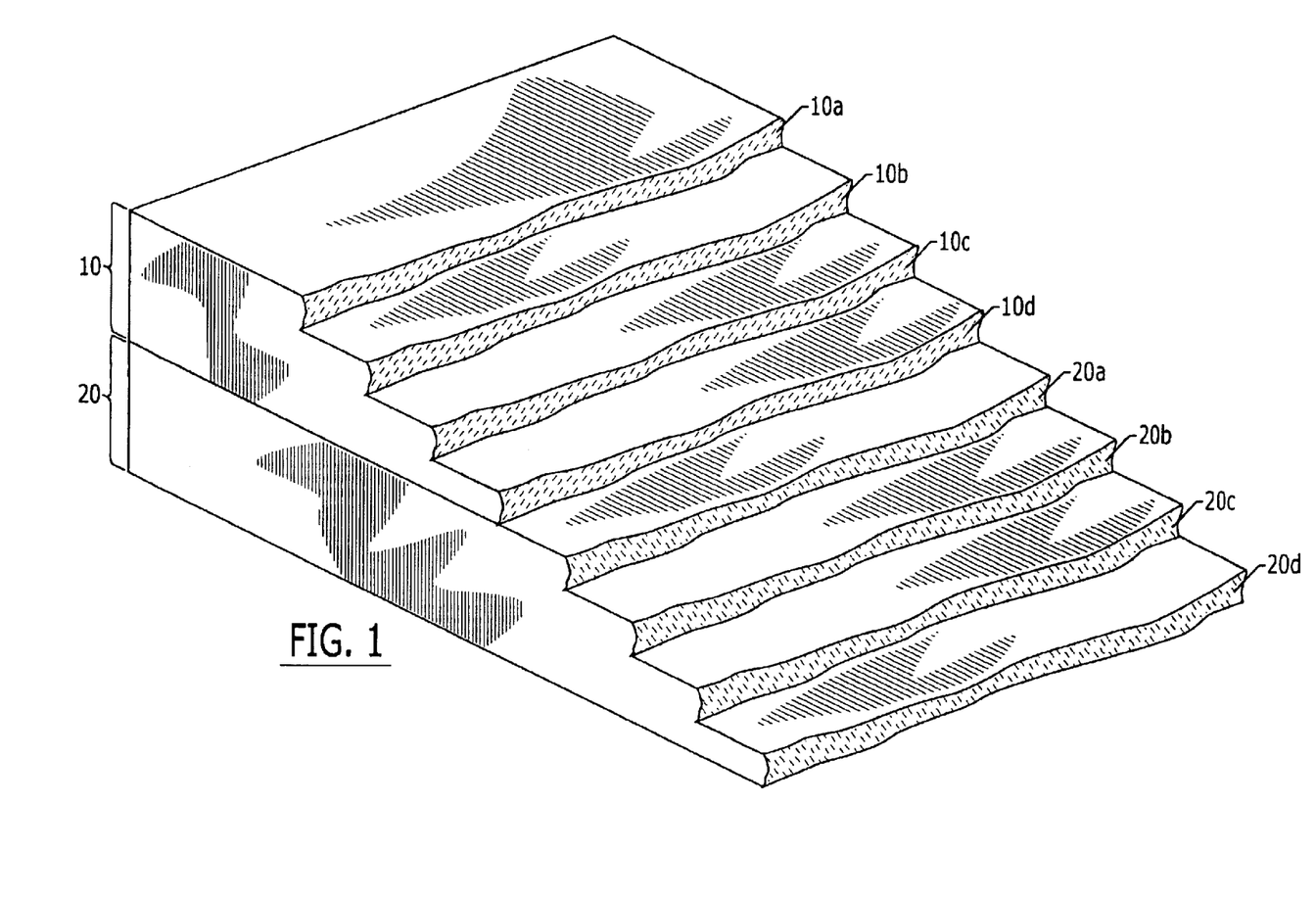
FIG. 1 illustrates a laminate according to an embodiment of the invention.

Referring to FIG. 1, the composite structure of the invention comprises at least one damping lamina 10 laminated to at least one structural lamina. Each lamina comprises multiple plies of fiber impregnated within a resin matrix. Each lamina may consist of from 2 to several hundred plies, preferably from 2 to about 20 plies, with typical lamina having from 4 to 6 plies (4 plies shown in FIG. 1). Each ply 10a, 10b, 10c, 10d of the damping lamina 10 comprises a planar layer of chopped, woven, or oriented continuous fiber embedded within a thermosetting resin matrix having resin properties as discussed above with respect to the damping lamina. Each ply 20a, 20b, 20c, 20d of the structural lamina 20 comprises a planar layer of chopped, woven, or oriented continuous fiber embedded within a thermosetting resin matrix having resin properties as discussed above with respect to the structural lamina.

Figure 2:
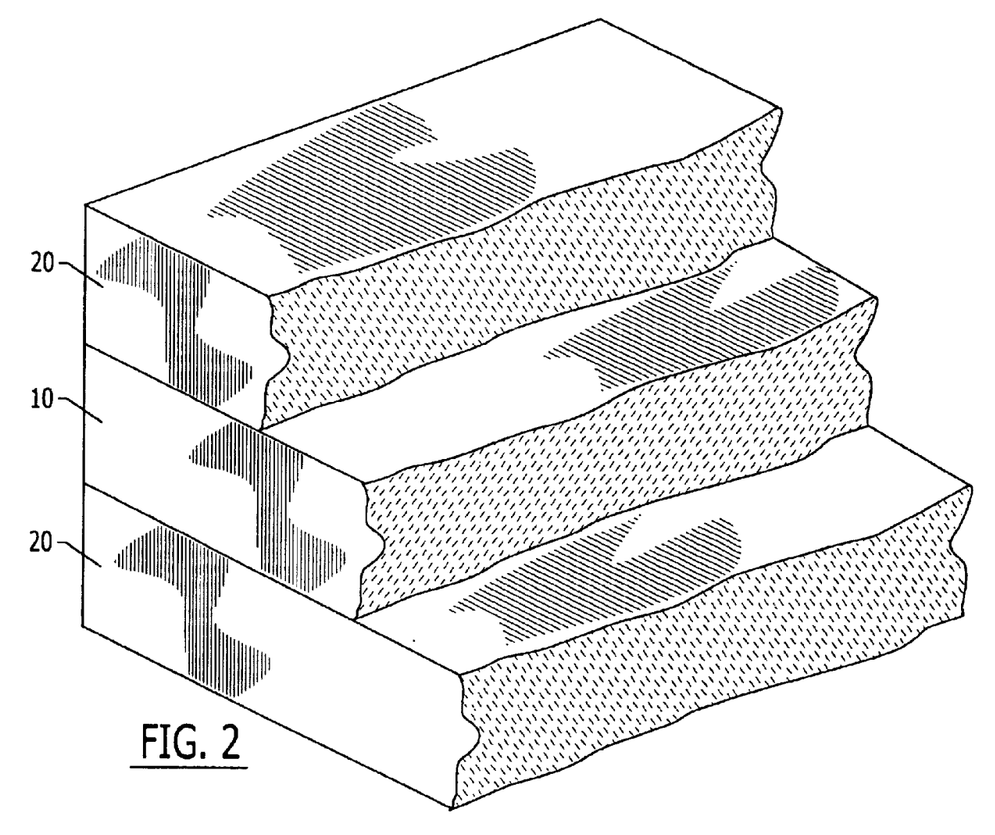
FIG. 2 illustrates a laminate having multiple structural lamina in accordance with another embodiment of the invention.
Figure 3:
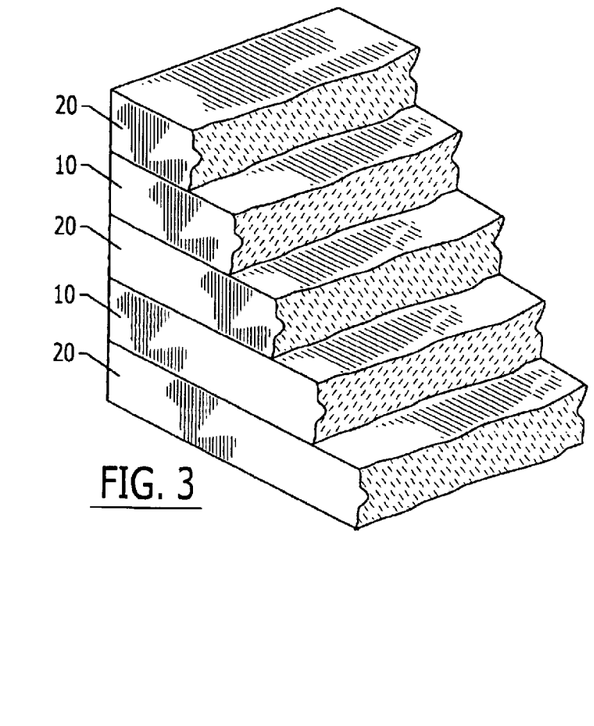
FIG. 3 illustrates a laminate having multiple structural lamina and multiple damping lamina in accordance with still another embodiment of the invention.

Referring to FIG. 2, the composite structure exhibits particularly favorable structural versus damping characteristics when the structure is faced with structural laminae 20 and the damping lamina 10 is internal with respect to the structural facing layers 20. The outer structural laminae 20 provide rigidity to the structure while the internal damping lamina 10 attenuates vibrations within the laminate while providing some structural support as well. Referring to FIG. 3, any number of damping laminae 10 and structural laminae 20 may be laminated together, but it is generally preferred that the outer layers of the laminate will be the structural laminae 20. Favorable results have been obtained by alternately laminating the different types of laminae. However, any arrangement of laminae may be used in accordance with the invention.

Figure 4:
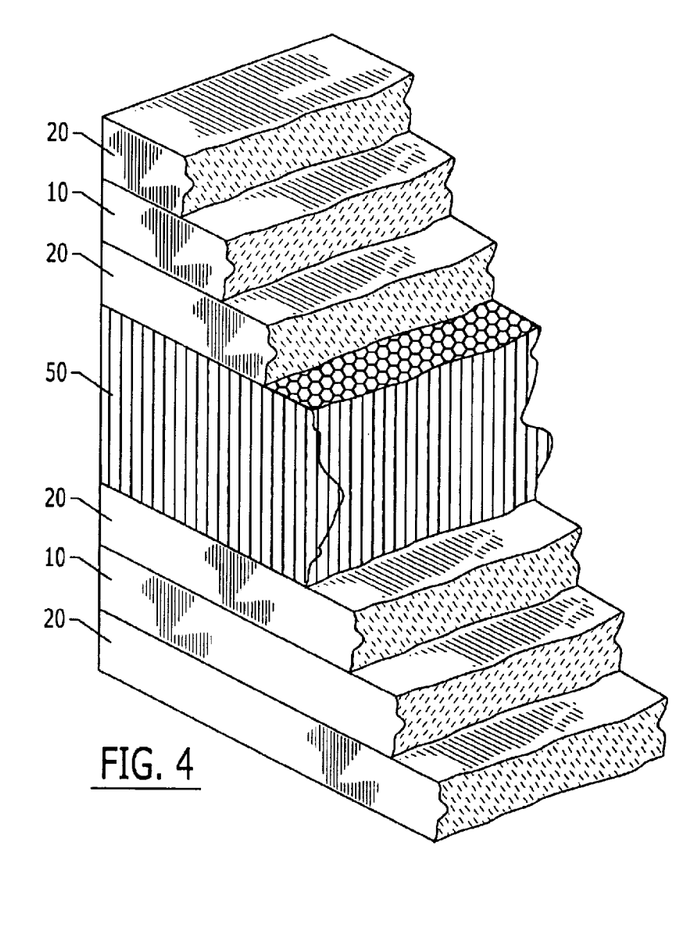
FIG. 4 illustrates a laminate comprising a honeycomb lamina in accordance with yet another embodiment of the invention.

Referring to FIG. 4, the invented laminate structure may be used in any application where traditional fiber-resin composite laminates could have been used in the past. For instance, the composite structure may be used to reinforce a honeycomb structure. As shown, two 3-laminae composite structures as described with respect to FIG. 2 are used to sandwich a honeycomb structure 50.

Impregnation and curing of the composite laminae are accomplished as previously known in the art. Exemplary methods of impregnating and curing the fiber-resin matrix are resin film infusion (RFI) methods as demonstrated in U.S. Pat. No. 5,902,535. RFI methods have allowed the production of composite structures up to 70 feet in length. The RFI process involves placing a resin film directly in between, and in contact with, the dry fiber preform and the mold tooling. The mold tooling, resin film and dry fiber preform are then vacuum bagged and inserted into an autoclave. As the temperature and pressure in the autoclave are increased, the resin film melts and is infused through the perform, and the resin is cured at temperature Vacuum assisted resin transfer molding (VARTM) has also grown over the past few years to include the fabrication of large composite structures for the marine industry, as well as secondary structures for military aircraft, such as engine inlet ducts. In VARTM the liquid resin is infused into the preform by pulling a vacuum on the mold tool. The liquid resin is introduced to the preform with inlet tubes and a manifold system located on the outer surface of the preform. The liquid resin is drawn through the preform via the vacuum pressure. Once the preform is infiltrated, the resin is cured at temperature.

The composite of the invention is designed to be provided as a cured laminate structure. However, the intermediate uncured prepreg produced during the fabrication of the structure may be stored, preferably under refrigeration, and supplied as a product for use in the construction of hybrid materials or other articles finding use for the prepreg.

The composite structure produced in accordance with this invention may be used in the construction of hybrid composites, that is the construction of composites with two or more types of reinforcing fibers. For instance, the invented laminate may be laminated with lamina having different fiber content and/or different resin content than the invented laminate. Such structures are also within the scope of the invention.

EXAMPLES

Preparation and Testing of Damping Lamina

Twelve samples of damping lamina were prepared. Each of the damping lamina samples consisted of 6 plies of continuous dry woven 90°-weave carbon fiber impregnated with Duralco™ 4538N epoxy resin, available from Cotronics Corp, Brooklyn, N.Y. The Duralco resin is supplied with a hardener that is compatible with the epoxy and acts to lower the $T_g$ of the epoxy.

A first set of four 6-ply lamina were prepared, each with a length of 4 inches and with respective resin/hardener ratios (by % weight) of 100 to 80, 100 to 120, 100 to 200, and 100 to 300. The lamina were prepared by hand impregnation of the dry carbon woven cloth to a fiber-resin content of approximately 60 wt % fiber to 40 wt % resin. The plies were arranged in a 0°–90° orientation. The impregnated cloth was placed in an autoclave and cured by heating from 70° F. up to 250° F. over a 1 hour period, held at 250° F. for 4 hours, and cooled from 250 vF to 70° F. over another 4 hour period. The lamina was cured under vacuum of 85 psi, with beginning vacuum imposed at 3 psi/min and ending vacuum decreased at 3 psi/min.

The $T_g$ values for the laminae were 53.8° F. for the 100 to 80 lamina, 48.2° F. for the 100 to 120 lamina, 41.4° F. for the 100 to 200 lamina, and 32.9° F. for the 100 to 300 lamina.

A second set of four 6-ply lamina were prepared as above, but each with a length of 6 inches and with respective resin/hardener ratios (by % weight) of 100 to 80, 100 to 120, 100 to 200, and 100 to 300.

A third set of four 6-ply lamina were prepared as above, but each with a length of 8 inches and with respective resin/hardener ratios (by % weight) of 100 to 80, 100 to 120, 100 to 200, and 100 to 300.

Figure 5:
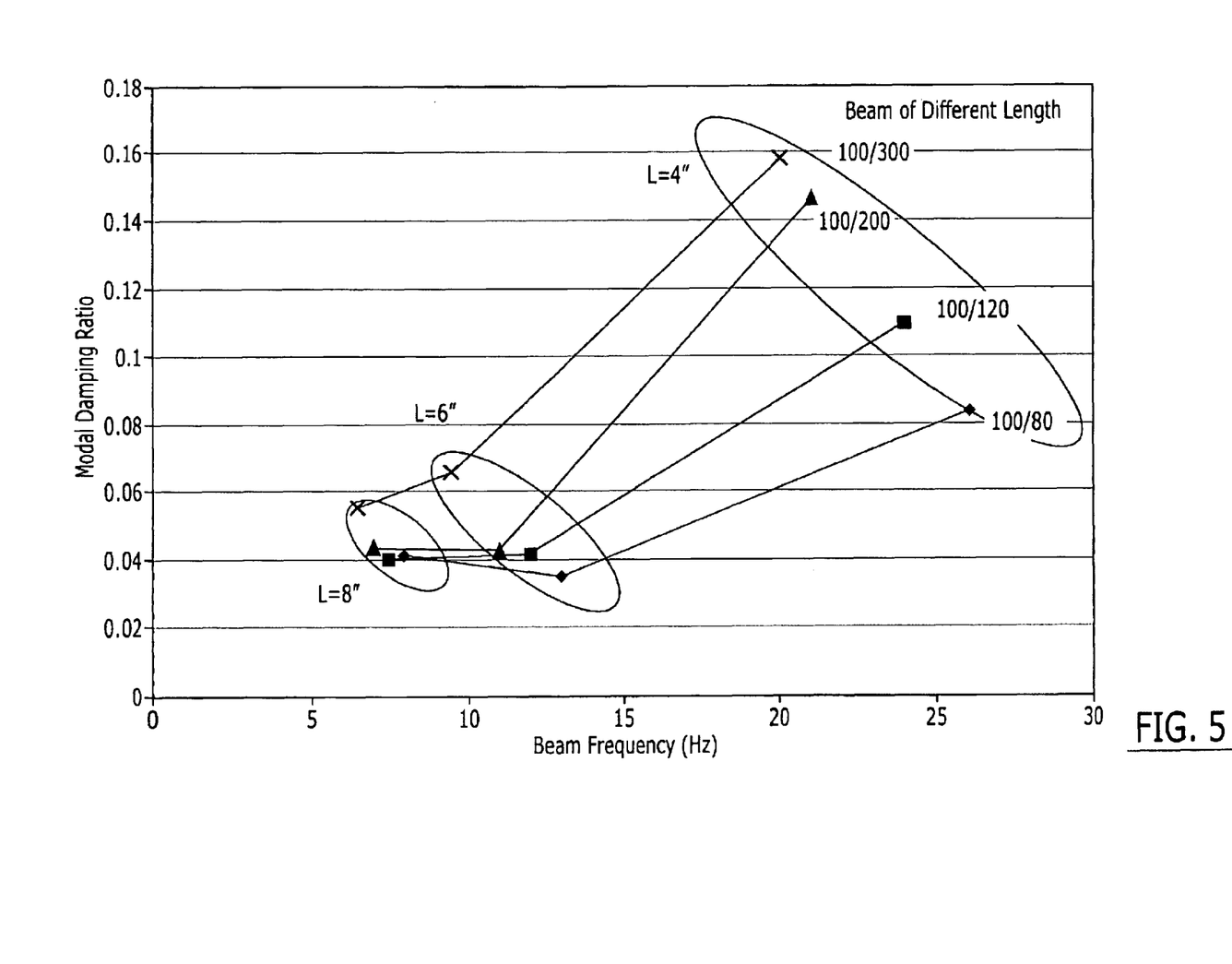
FIG. 5 is a graph showing the modal damping ratios for damping laminae prepared in accordance with the invention measured at various beam frequencies.

Referring to FIG. 5, the 4-inch, 6-inch, and 8-inch samples were tested over a range of beam frequencies and the Modal Damping Ratio was calculated for each sample at room temperature (70° F.). A chart showing the Modal Damping Ratio for each testing frequency is shown in FIG. 5. As shown, those samples having higher hardener content (lower $T_g$) generally demonstrate greater damping than those samples with lower hardener content.

Figure 6:
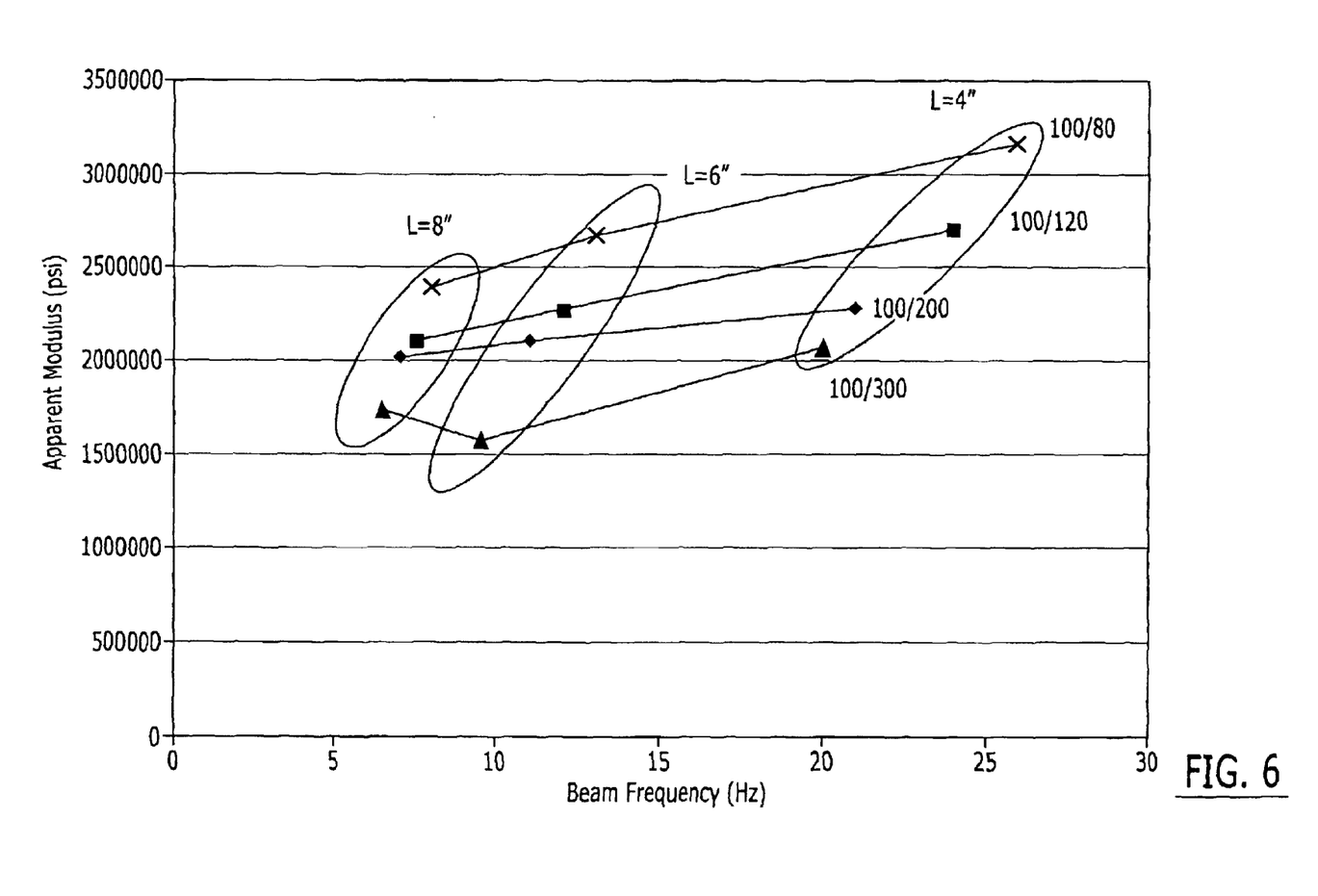
FIG. 6 is a graph showing the apparent modulus for damping laminae prepared in accordance with the invention measured at various beam frequencies.

Referring to FIG. 6, the 4-inch, 6-inch, and 8-inch samples were tested over a range of beam frequencies and the Apparent Modulus was calculated for each sample at room temperature (70° F.). A chart showing the Apparent Modulus for each testing frequency is shown in FIG. 6. As shown, those samples having higher hardener content (lower $T_g$) generally demonstrate lower strength, indicated by lower Apparent Modulus figures.

The results of the test demonstrate that the damping laminae produced by combining a fiber layer with a resin having a $T_g$ below the use temperature (here the test temperature) of the lamina results in a composite lamina having very high damping characteristics but lacking in overall strength compared to composites prepared without added plasticizers or other softening agents.

Laminates of Damping Lamina and Structural Lamina

Four composite laminates were prepared for modulus and damping loss factor over a range of temperatures.

The first composite (baseline) was prepared by laminating 12 plies of carbon fiber impregnated with an LTM-45 epoxy resin (referred to hereafter for purposes of these examples as "structural plies"). The laminate was layed up and cured as in the damping lamina example above.

The second composite (Hybrid 33%) was prepared by laminating, in order, 4 plies of damping plies, 4 plies of the structural plies, and 4 additional plies of the damping plies. The damping plies were prepared in the above example with a resin to hardener content of 100:300.

The third composite (Hybrid 50%) was prepared by laminating, in order, 2 plies of the structural plies, 3 plies of the damping plies, 2 plies of the structural plies, 3 plies of the damping plies, and 2 plies of the structural plies.

The fourth composite (100% damping) was prepared by laminating 12 damping plies.

Figure 7:
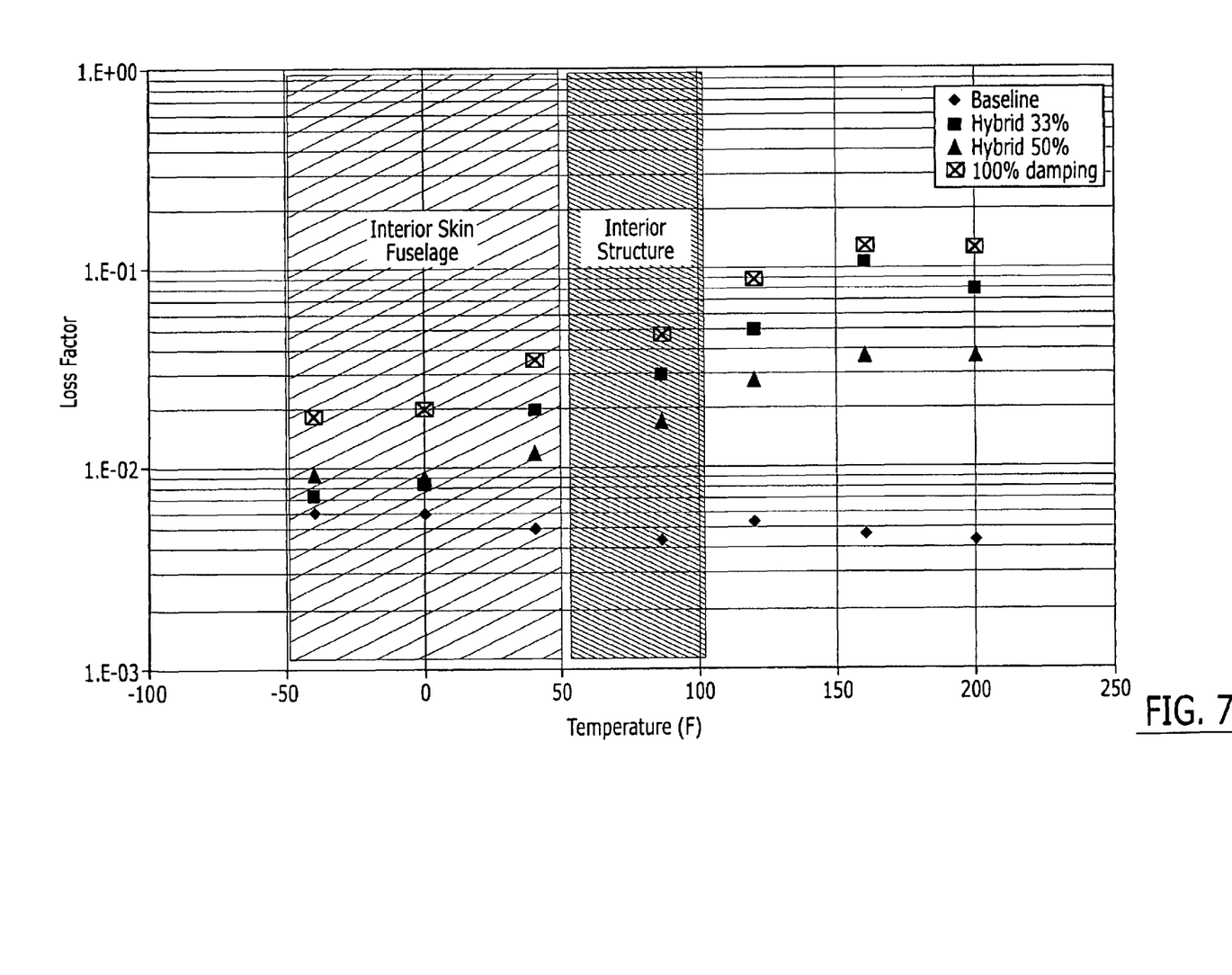
FIG. 7 is a graph showing loss factor for a base-line laminate compared with a damping laminate and two hybrid laminates prepared in accordance with the invention, measured at a variety of temperatures; and, FIG. 8 is a graph showing the measured modulus for a base-line laminate compared with a damping laminate and two hybrid laminates prepared in accordance with the invention, measured at a variety of temperatures.
Figure 8:
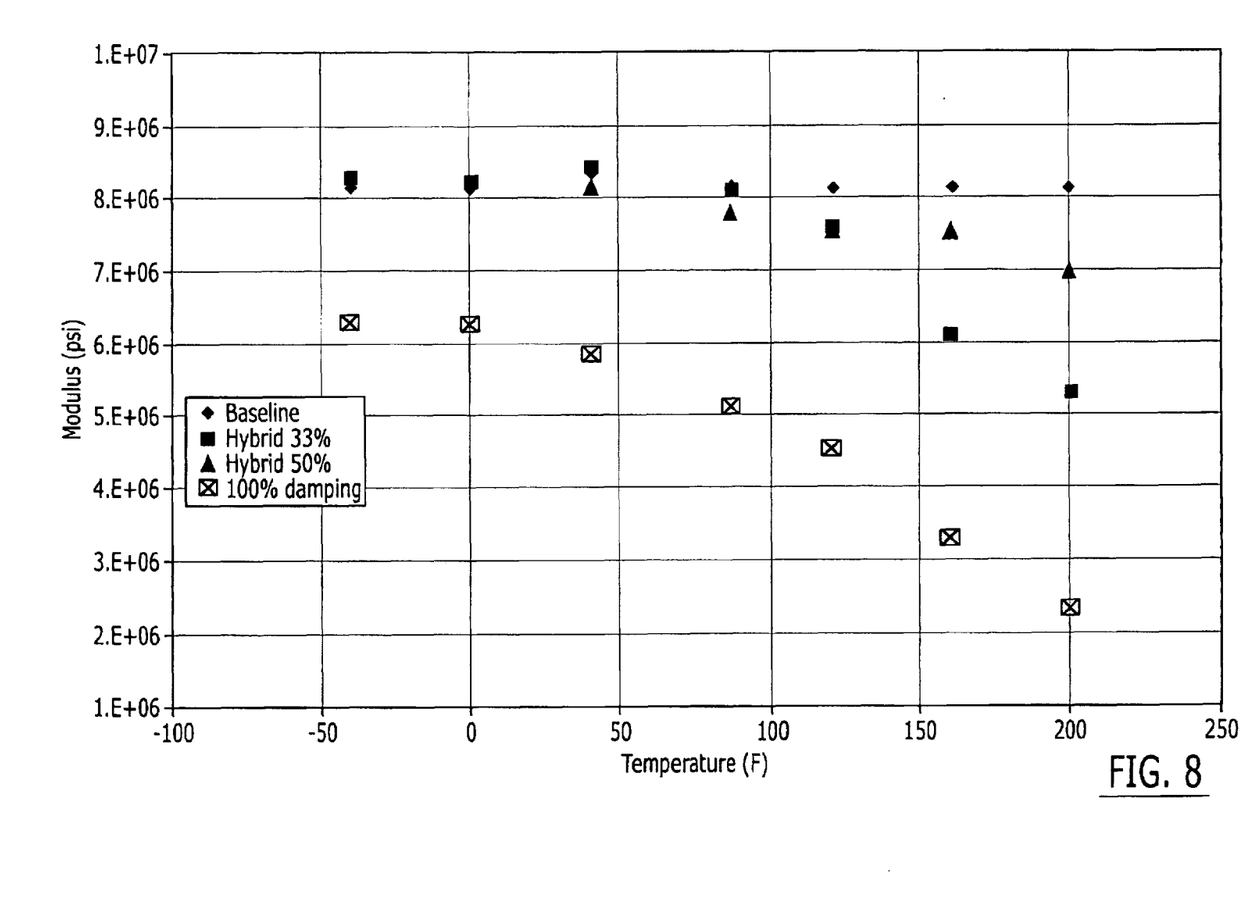

Referring to FIG. 7, the loss factor was measured/calculated for each of the composite samples over a range of temperatures and the results were plotted. Referring to FIG. 8, the modulus was measured/calculated for each of the composite samples over a range of temperatures and the results were plotted.

The results of the test demonstrate that the hybrid laminates of the invention may be constructed to have strength characteristics, i.e. modulus, similar to previous high-strength laminates, particularly over common use temperatures of about 0° F. to about 100° F. At the same time, the hybrid laminates are shown to have dramatically improved damping characteristics compared to standard high-strength laminates, particularly when tested at temperatures above about 50° F. Thus, the laminates of the invention provide a dramatic increase in damping with a minimal loss in strength compared to typical high-strength composite laminates.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composite laminate structure having improved damping characteristics, comprising
   a damping lamina having from 40 to 70 wt % fibers impregnated within a first thermosetting resin matrix;
   a structural lamina having from 40 to 70 wt % fibers impregnated within a second thermosetting resin matrix; and,
   wherein the first resin is present in the viscoelastic state and the second resin is present in the glassy state.

2. The structure of claim 1, wherein each of the damping and structural lamina comprise from 2 to 20 plies.

3. The structure of claim 1, wherein the fibers of the laminae are selected from the group consisting of carbon fiber, aramid fiber, glass fiber, and combinations thereof.

4. The structure of claim 3, wherein the fibers of the structural lamina are continuous carbon fibers.

5. The structure of claim 1, wherein the thermosetting resins of the damping and the structural laminae are epoxy resins with thermal stability of at least 200° F.

6. The structure of claim 5, wherein the epoxy resin of the damping lamina has a plastisizer content of between 12 wt % and 35 wt % by total weight of the first resin and wherein the epoxy resin of the structural lamina has a plastisizer content of less than 10 wt % by total weight of second resin.

7. The structure of claim 6, wherein the plastisizer content of the second resin is less than 5 wt % by total weight of the second resin.

8. The structure of claim 6, wherein the plastisizer content of the first resin is between 12.5 wt % and 17 wt % by total weight at the first resin.

9. The structure of claim 1, further comprising a plurality of damping laminae and a plurality of structural laminae, wherein the structural laminae comprise the outer laminae of the laminate.

10. A composite laminate structure comprising
    a damping lamina having from 40 to 70 wt % fibers impregnated within a first thermosetting resin matrix;
    a structural lamina having from 40 to 70 wt % fibers impregnated with a second thermosetting resin matrix; and,
    wherein the first resin resides above its glassification temperature and wherein the second resin resides below its glassification temperature.

11. The structure of claim 10, wherein each of the damping and structural second lamina comprise from 2 to 20 plies.

12. The structure of claim 11, wherein the fibers of the laminates are selected from the group consisting of carbon fiber, aramid fiber, glass fiber, and combinations thereof.

13. The structure of claim 12, wherein the fibers of the structural lamina are continuous carbon fibers.

14. The structure of claim 10, wherein the thermosetting resin of the damping and the structural lamina is an epoxy resin with thermal stability of at least 200° F.

15. The structure of claim 10, wherein the second resin has a plasticizer of less than 10 wt % by total weight of the second resin.

16. The structure of claim 10, wherein the first resin has a plasticizer content of between 12 wt % and 35 wt % by total weight of the first resin.

17. The structure of claim 10, further comprising a plurality of damping laminae and a plurality of structural laminae, wherein the structural laminae comprise the outer laminae of the laminate.

18. A method of fabricating a laminate structure having improved damping characteristics, comprising the steps of
    forming a damping lamina by impregnating a fiber layer with a first thermosetting resin matrix having a plastisizer content of between 12 wt % and 35 wt % by total weight of the first resin;
    forming a structural lamina by impregnating a fiber layer with a second thermosetting resin matrix having a plastisizer content of less than 10 wt % by total weight of second resin;
    layering the damping and structural lamina; and
    curing the resins.

19. The method of claim 18, wherein the damping lamina has a fiber content of about 40 wt % to about 70 wt % fiber per total weight of the lamina.

20. The method of claim 18, wherein the structural lamina has a fiber content of about 40 wt % to about 70 wt % fiber per total weight of the lamina.

21. The method of claim 18, wherein the step of forming the damping lamina comprises the steps of
    forming from 2 to 20 plies of fiber impregnated with the first thermosetting resin and layering the plies to form the damping lamina.

22. The method of claim 18, wherein the step of forming the structural lamina comprises the steps of
    forming from 2 to 20 plies of fiber impregnated with the second thermosetting resin and layering the plies to form the structural lamina.

23. The method of claim 18, wherein the plastisizer content of the second resin is less than 5 wt % by total weight of the second resin.

24. The method of claim 18, wherein the plastisizer content of the first resin is between 12.5 wt % and 17 wt %.

25. The method of claim 18, further comprising the steps of
    forming a plurality of damping laminae and a plurality of structural laminae; and,
    layering the laminae such that the structural laminae comprise the outer laminae of the laminate.

26. The method of claim 25, further comprising the step of laminating the plurality of damping laminae and structural laminae to an additional dissimilar laminate, thereby forming a hybrid laminate.

27. The method of claim 26, wherein the fibers of the dissimilar laminate are of dissimilar composition as those fibers of the damping and structural laminae.

* * * * *